(12) United States Patent
Ramasamy et al.

(10) Patent No.: US 12,237,853 B2
(45) Date of Patent: Feb. 25, 2025

(54) SYSTEM AND METHOD FOR INTEGRATING RADIO SYSTEM COOLING AND ANTENNA POWER MANAGEMENT SYSTEMS

(71) Applicant: Dell Products, LP, Round Rock, TX (US)

(72) Inventors: Suresh K. Ramasamy, Cedar Park, TX (US); Travis C. North, Cedar Park, TX (US); Qinghong He, Austin, TX (US); Adolfo S. Montero, Pflugerville, TX (US)

(73) Assignee: DELL PRODUCTS LP, Austin, TX (US)

( * ) Notice: Subject to any disclaimer, the term of this patent is extended or adjusted under 35 U.S.C. 154(b) by 398 days.

(21) Appl. No.: 17/583,637

(22) Filed: Jan. 25, 2022

(65) Prior Publication Data
US 2023/0238988 A1 Jul. 27, 2023

(51) Int. Cl.
*H01Q 1/02* (2006.01)
*H04B 1/036* (2006.01)
*H04B 1/40* (2015.01)

(52) U.S. Cl.
CPC ............... *H04B 1/036* (2013.01); *H01Q 1/02* (2013.01); *H04B 1/40* (2013.01)

(58) Field of Classification Search
CPC . H04B 1/036; H04B 1/02; H04B 1/40; Y02D 10/00; G06F 1/203; G06F 1/206; G06F 1/325; G06F 1/1698
See application file for complete search history.

(56) References Cited

U.S. PATENT DOCUMENTS

| | | | |
|---|---|---|---|
| 6,891,726 B1 | 5/2005 | Montoya | |
| 9,293,802 B2 | 3/2016 | Voss | |
| 9,557,786 B2 | 1/2017 | Wang | |
| 11,199,885 B1 * | 12/2021 | Winter | G06F 1/206 |
| 2011/0055596 A1 * | 3/2011 | Wyatt | G06F 1/3203 345/212 |
| 2015/0075186 A1 | 3/2015 | Prajapati | |

(Continued)

FOREIGN PATENT DOCUMENTS

CA 2384621 A1 3/2001

*Primary Examiner* — Awat M Salih
(74) *Attorney, Agent, or Firm* — Prol Intellectual Property Law, PLLC; H. Kenneth Prol

(57) ABSTRACT

An information handling system executing an integrated antenna power and cooling management system may comprise an antenna situated nearby components of the information handling system, a chassis enclosing the information handling system, the antenna, and a wireless interface device with a wireless radio to generate a signal to transmit data via the antenna, where the components and the chassis are capable of absorbing a total thermal heat capacity, the chassis having an outer surface coming into contact with human skin during execution of the information handling system, a temperature sensor to determine an operating temperature of the information handling system reaching a control point value, and a processor executing code instructions to estimate antenna thermal output during data transmission relative to the total thermal heat capacity of the components, based on the operating temperature of the information handling system, and control an active cooling system for cooling the chassis.

20 Claims, 4 Drawing Sheets

(56) References Cited

U.S. PATENT DOCUMENTS

| | | |
|---|---|---|
| 2016/0268694 A1 | 9/2016 | Ma |
| 2020/0192442 A1* | 6/2020 | Islam ................ H04W 52/0209 |
| 2023/0128811 A1* | 4/2023 | Kim ....................... H01Q 21/06 |
| | | 343/893 |

* cited by examiner

SYSTEM AND METHOD FOR INTEGRATING RADIO SYSTEM COOLING AND ANTENNA POWER MANAGEMENT SYSTEMS

FIELD OF THE DISCLOSURE

The present disclosure generally relates to wireless communication performance for computing devices. More specifically, the present disclosure relates to a system for integrating radio system cooling and antenna power management systems to ensure portions of a chassis enclosing the antenna that come into contact with human skin stay within preset tolerances.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
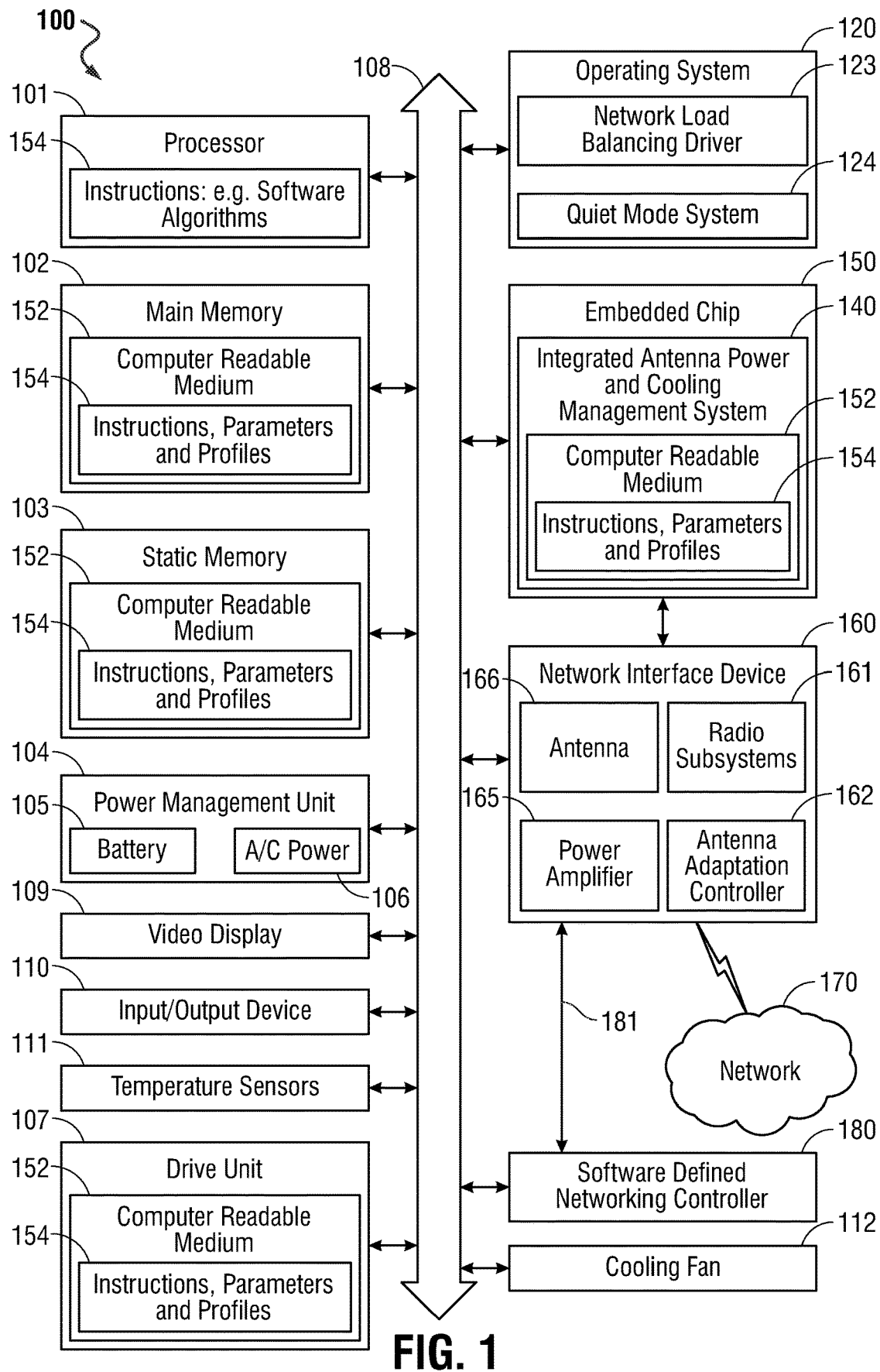
FIG. 1 is a block diagram illustrating an information handling system including an integrated antenna power and cooling management system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Mobile devices frequently coming into contact with a user's skin (e.g., hands, laps, etc.) may employ a variety of cooling mechanisms or other thermal control mechanisms designed to ensure the portions of the exterior chassis surface or "skin surface" of such devices that frequently contact a user's skin stay at or below temperatures most users find comfortable. The components housed within a chassis of such an information handling system in various embodiments described herein that are most likely to generate heat affecting the skin surface temperature include various processors (e.g., central processing unit (CPU), or graphics processing unit (GPU)), power systems or battery, and antennas and radio subsystems used in wireless communication with networks connected to the internet. In particular, antennas and radio subsystems operating under the 5G standard with high data bandwidth may consume up to 13 Watts of power and generate heat during operation.

Existing systems employ structures such as fans, heat sinks, cooling strips, as various active or passive cooling methods. Additional thermal control methods may include capping or down-throttling power supplied to these heat-producing components (e.g., processors and antennas) but which may reduce performance of such heat producing components. However, the new cellular wireless 5G standard toward which communications for many mobile computing devices has shifted may utilize transmission of data continuously or even in short bursts that markedly increase the power drawn by antennas over a short time period. In order to capture the benefits of the new 5G standards, including greater data transmission speed or data bandwidth, mobile computing device antennas may need to perform such burst transmissions routinely in some embodiments. Existing thermal control methods intended to keep skin temperatures of portions of an information handling system chassis at or near the 5G antennas or radios at or below a user's comfort level may involve throttling of power delivered to the antenna during either continuous data transmission or during such bursts. In other embodiments, thermal control methods may include limiting the frequency of such bursts. A solution that maintains the mobile computing device skin temperature at or below user comfort levels and allows for such burst transmissions or continuous data transmission is needed.

An integrated antenna power and cooling management system in embodiments of the present disclosure addresses these issues by delaying default thermal control mechanisms involving throttling of power delivered to the antenna long enough for 5G transmissions to occur before degradation of 5G radio system with reduced power. In embodiments described herein, the integrated antenna power and cooling management system may ensure the skin temperature of the information handling system chassis housing, such as a maximum chassis skin temperature, near such an antenna does not exceed a threshold comfort value (e.g., 40 degrees Celsius) by transmitting data via an antenna such as a 5G antenna situated nearby various information handling system components, including passive cooling structures or the information handling system chassis that are capable of absorbing heat generated during antenna transmission.

The integrated antenna power and cooling management system in embodiments described herein may determine when an antenna has begun a high-bandwidth, high-speed, or burst data transmission or has reached a control point operating temperature, triggering a need to monitor heat output by the antenna in the form of estimated thermal energy during the transmission. In embodiments, the integrated antenna power and cooling management system may estimate the thermal energy likely to be output by the antenna during the burst transmission based on a measured operating temperature of the antenna, the power being supplied to the antenna, and the data bandwidth size being utilized for the data being transmitted. The antenna in various embodiments described herein may be located nearby one or more components of the information handling system, such as processors, memory, circuit boards, thermal control systems, network interface devices, or portions of a chassis enclosing the information handling system. One or more of these components may be capable of absorbing at least a portion of the heat energy emitted by the antenna during this high-bandwidth, high-speed, or burst data transmission.

The integrated antenna power and cooling management system in embodiments described herein may determine a total or combined capacity for all components or portions of the chassis nearby a transmitting antenna to absorb heat energy emitted by this antenna. In embodiments, the integrated antenna power and cooling management system may leverage the ability of these components to absorb the heat emitted by the antenna by inhibiting thermal control mechanisms that may degrade radio wireless data transmission capabilities until the estimated heat to be emitted by the antenna during the continuous data transmission or burst transmission meets or exceeds a preset percentage of the total or combined heat capacity for the components surrounding the antenna. This heat capacity value may be specific to individual information handling systems and to each antenna disposed on an information handling system. The heat capacity may be determined for one or more components proximate to each antenna disposed within the information handling system and within a specified distance or several specified distances of the heat-producing antenna system. For example, proximity of components or chassis identified for a total or combined heat capacity may include components within 1 centimeter, 5 centimeters, 10 centimeters, 50 centimeters or other distances from the heat producing antenna system. Any proximity distance may be used and thermal capacity based on distance and thermal properties or conductivity of the components may impact the proximity used, even as applied among various components or chassis portions whose heat capacities are included in a total or combined heat capacity. The integrated antenna power and cooling management system in some embodiments may further inhibit thermal control mechanisms requiring throttling of power to the antenna until other thermal control methods, such as increasing fan speed have been executed. In such a way, the integrated antenna power and cooling management system in various embodiments herein may extend the period in which continuous data transmission or burst transmissions may occur prior to throttling of power delivered to the antenna. Other thermal control methods may be employed to limit the 5G radios and the antenna system such as with reduced data burst transmission frequency, or suspending 5G data transmission for a period.

FIG. 1 illustrates an information handling system 100 according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile computing device, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In an embodiment, the information handling system may include an embedded chip 150 that may be any device or devices that execute instructions, parameters, and profiles 154 of an integrated antenna power and cooling management system 170 to monitor and control a period of time in which an antenna 166 may draw high rates of power, transceive larger volumes of data, and consequently manage increases in the temperature of a chassis enclosing the information handling system 100 and the antenna 166 such as with control of active cooling system, for example, control of a speed of a cooling fan 112. The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), either of which may be the processor 101 illustrated in FIG. 1, hardware or software control logic, or any combination thereof. Additional components of the information handling system 100 may include one or more storage devices 103 or 107, a network interface device 160, one or more communications ports for communicating with external devices, as well as, various input and output (110) devices 110, such as a keyboard, a mouse, or any combination thereof. A power management unit 104 supplying power to the information handling system 100, via a battery 105 or an alternating current (A/C) power adapter 106 may supply power to one or more components of the information handling system 100, including the processor 101, the network interface device 160, and the temperature sensors 111.

The information handling system 100 may include one or more types of temperature sensors 111 (e.g., thermocouples, resistance temperature detectors, thermistors, optical thermal sensors, or semiconductor based integrated circuits), which may be strategically located nearby or between various components of the information handling system 100 and the chassis enclosing it. For example, a temperature sensor 111 may be located at or near a portion of the antenna 166 in order to measure an operating temperature of the antenna 166. As another example, a temperature sensor 111 may be located between the chassis skin surface and the antenna 166 to measure the effect of the operation of the antenna (e.g., 166) on the surface or skin temperature of the outer layer of the chassis enclosing the information handling system 100. As yet another example, a temperature sensor 111 may be located between the chassis skin surface and the processor 101 to measure the effect of the processor operation on the surface or skin temperature of the outer layer of the chassis enclosing the information handling system 100. In still another example, a temperature sensor 111 may be located just beneath or incorporated within the chassis enclosing the information handling system 100 in order to directly measure the temperature on the surface or skin temperature of the outer layer of the chassis enclosing the information handling system 100.

The information handling system 100 may further include video display 109. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 154 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a GPU, embedded controllers (e.g., 150) or control logic or some combination of the same. Any of the processing resources may operate to execute code that is either firmware or software code. Moreover, the information handling system 100 may include memory such as main memory 102, static memory 103, containing computer readable medium 152 storing instructions 154. Instructions 154 may include an integrated antenna power and cooling management system 140, operating system (OS) software 120, application software, BIOS software, or other software applications or drivers (e.g., 123 or 124) detectable by processor type 101.

The OS 120 in an embodiment may be capable of executing a plurality of software applications, including, for example, a network load balancing driver 123. The network load balancing driver 123 in an embodiment may track bandwidth of all software applications executing under the OS 120, pursuant to which data is transferred via a wireless link to the network 170. Additionally, the network load balancing driver 123 in an embodiment may operate to balance the transceiving of data packets pursuant to execution of software applications by the OS 120 across a plurality of network interface devices (e.g., 160). The OS 120 may also operate a quiet mode system 124 including a graphical user interface allowing a user to set a noise level generated by the various components of the information handling system during operation. For example, such a quiet mode system 124 may directly or indirectly allow a user to mute speakers, decrease the speed of fan 112, or decrease power to a CPU in order to decrease noise generated by the information handling system, particularly during efforts to disperse heat generated by various internal components. The OS 120 may operate a graphical user interface with the video display 109 to provide a selectable setting for a user to activate the quiet mode system 124 in settings interface, or provide an interface to activate one or more aspects of a quiet mode system 124.

The disk drive unit 107 and static memory 103 may also contain space for data storage in a computer readable medium 152. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices, display 109, or the network interface device 160, or the like.

Information handling system 100 in an embodiment may comprise a mobile computing device, such as a laptop or tablet computer, as described in greater detail herein, or may, in some embodiments, comprise a docking station for such a mobile computing device. The information handling system 100 in such an embodiment may operate on wired and wireless links to connect with the network 170 via a network Access Point (AP), as described in greater detail herein.

The network interface device 160 may provide connectivity of the information handling system 100 to the network 170 via a network AP in an embodiment. The network 170 in some embodiments may be a wired local area network (LAN), a wireless personal area network (WPAN), a wireless Local Area Network (WLAN), such as a public WiFi communication network, a private WiFi communication network, or other non-cellular communication networks. In other embodiments, the network 170 may be a wired wide area network (WAN), a wireless wide area network (WWAN), such as a 4G LTE network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols or Bluetooth® protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

The SDN controller 180 in an embodiment may operate, in part, to route data incoming from or outgoing to a specifically identified software application executing at the OS 120 such that the data is only transceived within a radio frequency sub-portion or network slice assigned to that specifically identified software application by the network load balancing driver 123. For example, the SDN controller 180 may be capable of routing packets transceived pursuant to execution of software applications grouped by the network load balancing driver 123. For example, packets with a high priority designation may be grouped by the network load balancing driver 123 for routing through a specific network interface device (e.g., 160), or through a specific antenna (e.g., 166).

The network interface device 160 may be communicatively coupled to the SDN controller 180 via bus 108 or via a separate communication line 181. The communication line 181 and bus 108 in an embodiment may support one or more protocols for routing packets/frames between or among network interface devices via an SDN controller 180, such as, for example, the OpenFlow® protocol, or the Interface to the Routing System (i2rs) protocol. It is contemplated that communication line 181 or bus 108 may support any other currently known or later developed protocols for control of a network interface device by an SDN controller 180. The SDN controller 180 in an embodiment may include, for example, an OpenDaylight® controller, a Nicira Networks/VMWare NOX™ controller, a NTT®/Google ONIX controller, the NEC® Trema® controller, the NTT® Ryu® controller, or open-sourced controllers such as PDX or Beacon controllers. In some embodiments, the SDN controller 180 may comprise a software-defined wide-area network (SD-WAN) controller operating to unify networking connections covering a wide geographical area within an enterprise.

In an embodiment, the network interface device 160 may be communicatively coupled to one or more antennas (e.g., 166) as part of an antenna systems 163 used to provide one or more separate communication channels to the network 170. Such communications channels may be found in any communication network described herein. The antennas 166 may support Wi-Fi 6, Wi-Fi 6e, or a 5G wireless communication protocol so that relatively higher amounts of data may be transceived by the information handling system 100 to any communication network to which the information handling system 100 is communicatively coupled in some embodiments.

The integrated antenna power and cooling management system 140, executing code instructions 154 via processor 101 or via an embedded chip 150 in an embodiment addresses these issues by delaying default thermal control mechanisms involving throttling of power delivered to the antenna 166 for controlled duration based on capabilities of various other components (e.g., 101, 102, 103, 107, 160, 112, or 150) to absorb antenna generated heat for 5G burst transmissions or continuous 5G data transmissions to occur and control of active cooling systems. The integrated antenna power and cooling management system 140 may receive an indication when the network interface device 160 begins transmission of a signal or continuous high speed or high bandwidth 5G signal via antenna 166 in an embodiment.

The integrated antenna power and cooling management system 140 in an embodiment may receive temperature measurements from a thermal sensor 111 co-located with the antenna 166 and capable of measuring operating temperatures of the antenna 166. When the antenna 166 temperature reaches a preset control point value (e.g., 50 degrees Celsius), or when the integrated antenna power and cooling management system 140 determines that a burst transmission or a continuous high speed or high bandwidth transmission has begun, the integrated antenna power and cooling management system 140 may estimate a thermal energy likely to be output by the antenna 166 during such a burst transmission or continuous high speed or high bandwidth transmission. This determination may be made based on a measured value of power (e.g., in Watts) being supplied to the antenna 166 by the power management unit 104, the data bandwidth for the transmission (e.g., as determined via communication with the network interface device 160), a known mass of the antenna (e.g., as stored in 102 in a lookup table), and the operating temperature of the antenna 166 as measured by the temperature sensor 111.

Memory 102 may further store a lookup table associating each antenna (e.g., 166) with a total or combined thermal heat capacity for all components (e.g., 102, 1X) known to absorb heat from that antenna (e.g., 166) as characterized for particular information handling systems and for each antenna 166 deployed in the information handling system 100. The integrated antenna power and cooling management system 140 in an embodiment may inhibit initiation of either cooling methods or thermal control methods (e.g., fans or throttling of power) until the estimated heat to be emitted by the antenna during the burst transmission or continuous high speed or high bandwidth transmission meets a preset percentage of the known total or combined thermal heat capacity for all components surrounding the antenna (e.g., 166). In such a way, the integrated antenna power and cooling management system 140 in an embodiment may exploit the heat absorbing capabilities of various components surrounding the antenna 166 to lengthen the duration of the burst transmission or continuous high speed or high bandwidth transmission, prior to throttling of power delivered to the antenna 166, or other performance degrading thermal control methods.

The integrated antenna power and cooling management system 140 in an embodiment may determine the transceiving bitrate (e.g., 20 Gbit/s) via communication with the network interface device 160. In another aspect of an embodiment, the integrated antenna power and cooling management system 140 may determine the power being supplied to the antenna 166 via communication with the power management unit 104 or one or more components of the network interface device 160. For example, the power management unit may supply up to 13 Watts of power to the antenna 166 for transceiving of data in a burst or in a continuous high speed or high bandwidth transmission. In other embodiments, the power management unit 104 may deliver other amounts of power. The integrated antenna power and cooling management system 140 in an embodiment may determine the known Wattage supplied to the antenna 166 via communication with the power management unit 104, or the network interface device 160, for example. The network interface device 160 may include a power amplifier 165 operating to amplify the amount of power supplied to the antenna 166. In such an embodiment, the network interface device 160 may indicate to the integrated antenna power and cooling management system 140 the amount of amplified power being drawn by the antenna 166 via such a power amplifier 165 at a given time.

The antenna adaptation controller 162 may execute instructions as disclosed herein for monitoring wireless link state information, wireless link configuration data, network slice data, or other input data to generate channel estimation and determine antenna radiation patterns. For example, the antenna adaptation controller 162 in an embodiment may gather beacon data received from one or more nearby access points (APs) for the network 170 describing channels available for communication with that AP, as well as various current traffic metrics for communications on those channels. More specifically, such beacon information may provide a relative signal strength indicator (RSSI), identification of the network 170 as private or public, identification of the network 170 as compatible with multiple user, multiple input, multiple output (MU-MIMO) communications, high available data rate, levels of channel contention, and current load of communications at the AP. Such beacon data may include such measurements or indications for each of the channels within which the AP is capable of transceiving data, and the beacons may be received in regular intervals. Such received beacon data may be stored in an embodiment at the main memory 102, or in temporary BIOS memory accessible in kernel mode. Instructions or a controller may execute software or firmware applications or algorithms which utilize one or more wireless links for wireless communications via the network interface device 160 and the plurality of antennas 166 for the plurality of supported wireless protocols as well as other aspects or components. Antenna adaptation controller 162 may also control selection from among an available plurality of antennas 166 via antenna switching or adjust antenna matching or antenna directionality in some cases for antenna 166, tune multi-frequency antennas for different bands, or adjust antenna directionality such as via phase shifting, use of parasitic elements or other similar techniques.

The network interface device 160 in an embodiment may further include a radio subsystem 161 which may operate to modulate and demodulate signals transceived within a WWAN or WLAN format, set signal transmission power levels or sensitivity to signal reception, select channels or frequency bands, and conduct other functions in support of a wireless transmission from the information handling system 100 to the communication network 170.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 170 may communicate voice, video or data over the network 170. Further, the instructions 154 may be transmitted or received over the network 170 via the network interface device 160. The information handling system 100 may include a set of instructions 154 that may be executed to cause the computer system to perform any one or more of the methods or computer-based functions disclosed herein. For example, instructions 154 may include a particular example of an integrated antenna power and cooling management system 140, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

The integrated antenna power and cooling management system 140 may utilize a computer-readable medium 152 in which one or more sets of instructions 154 such as software may be embedded. The instructions 154 may embody one or more of the methods or logic as described herein. For example, instructions relating to the integrated antenna power and cooling management system 140, software algorithms, processes, and/or methods may be stored here.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the integrated antenna power and cooling management system 140 may be stored in static memory 103, or the drive unit 107 on a computer-readable medium 152 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
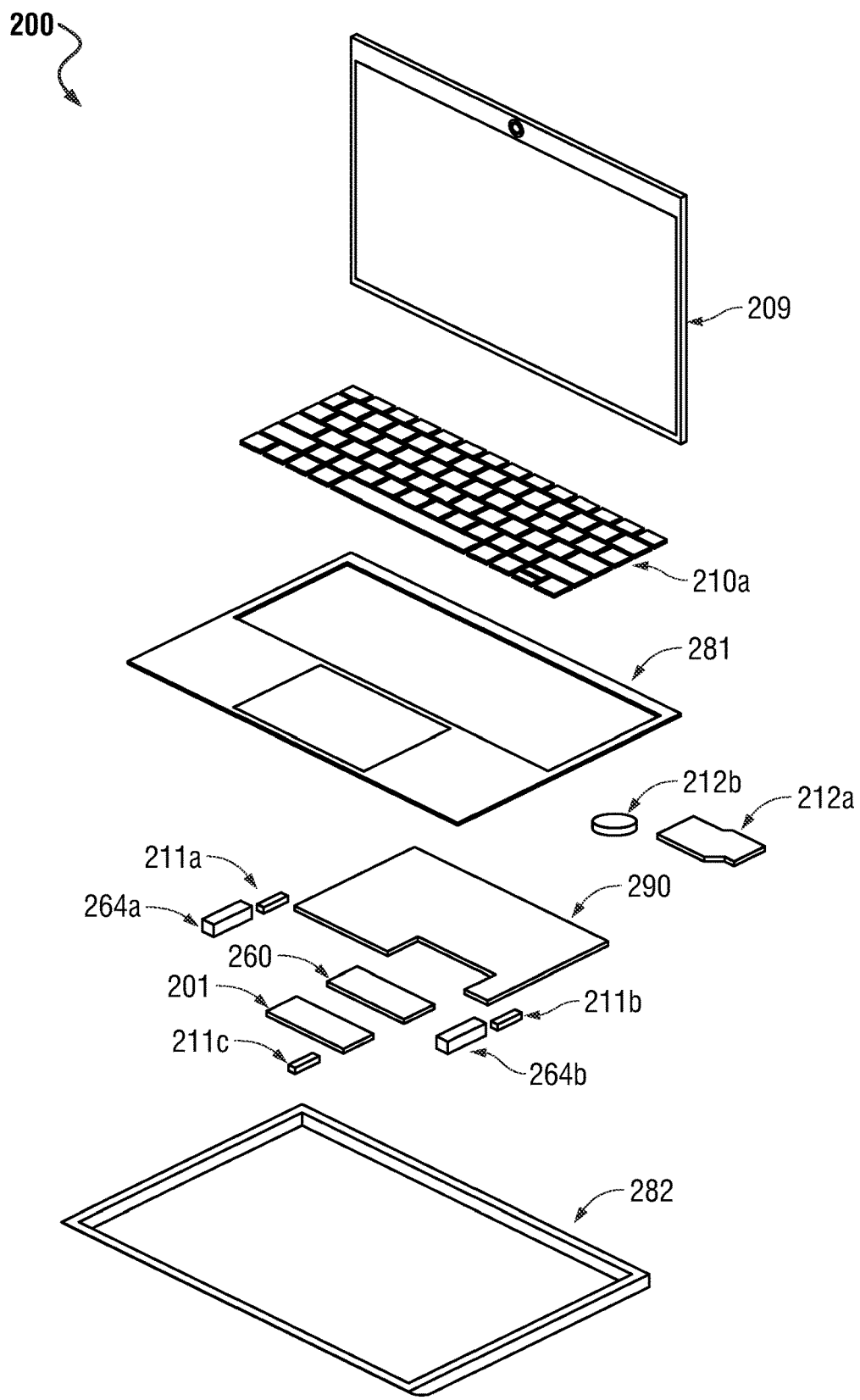
FIG. 2 is a graphical diagram illustrating an exploded view of components housed within an information handling system chassis rated for a maximum skin surface temperature according to an embodiment of the present disclosure.

FIG. 2 is a graphical diagram illustrating an exploded view of components of an information handling system 200 housed within a chassis rated for a maximum skin surface temperature according to an embodiment of the present disclosure. An information handling system 200 in an embodiment may comprise a video display 209, a keyboard 210a, a motherboard 290, a Central Processing Unit (CPU) 201, a conventional or existing thermal control system 212a, a fan 212b, one or more antennas (e.g., 264a and 264b) and one or more temperature sensors (e.g., 211a, 211b, or 211c, or various temperature sensors located along the interior surface of the chassis). A chassis comprising a bottom portion 282 and a palm rest portion 281 may enclose several components of the information handling system, including the antennas 264a and 264b. Such a chassis for example may be rated to have a max skin temperature at 45 degrees Celsius to avoid harm or discomfort to a user who may come into contact with an external part of the chassis of information handling system 200. Various components not pictured here but described in greater detail with respect to FIG. 1 may also be enclosed within such a chassis.

As described herein, an information handling system 200 frequently coming into contact with a user's skin (e.g., hands, laps, etc.) may employ a variety of cooling mechanisms and other thermal control mechanisms designed to ensure the portions of the exterior surface or "skin surface" of such devices that frequently contact a user's skin stay at or below temperatures most user's find comfortable. The components housed within a chassis (e.g., including portions 281 and 282) of such an information handling system in various embodiments described herein that are most likely to generate heat affecting the skin surface temperature include various processors (e.g., CPU 201, or graphics processing unit (GPU)), and antennas (e.g., 264*a* and 264*b*) used in wireless communication with networks connected to the internet.

Existing cooling systems 212*a* employ structures such as fans (e.g., 212*b*), heat sinks, cooling strips, and various other thermal control methods primarily pointed at capping or down-throttling power supplied to these heat-producing components (e.g., 201, 264*a*, or 264*b*). However, the new cellular 5G standard toward which communications for many mobile computing devices have shifted may utilize transmission of data in short bursts or in continuous high speed or high bandwidth transmissions that markedly increase the power drawn by antennas (e.g., 264*a* or 264*b*) over a short time period. In order to capture the benefits of same of the new 5G standard capabilities, including greater data transmission speed and data bandwidth, mobile computing device antennas (e.g., 264*a* or 264*b*) may perform such burst transmissions or continuous high speed or high bandwidth transmissions routinely in some embodiments. Existing thermal control methods (e.g., as controlled by 212*a*) intended to keep skin temperatures at or below a user's comfort level along with thermal control methods that may involve throttling of power delivered to the antenna (e.g., 264*a* or 264*b*) during such bursts or continuous high speed or high bandwidth transmissions, and inhibiting such bursts or continuous high speed or high bandwidth transmissions and limiting data transmission.

The integrated antenna power and cooling management system executed by the embedded controller or a combination of the embedded controller and a CPU 201 in an embodiment may address these issues by delaying default thermal control mechanisms (e.g., as controlled by 212*a*) that involve throttling of power delivered to the antenna (e.g., 264*a* or 264*b*) or the reduction or suspension of burst transmission or high speed/high bandwidth continuous transmission. The integrated antenna power and cooling management system in an embodiment may receive temperature measurements from a thermal sensor (e.g., 211*a* or 211*b*) located nearby an antenna (e.g., 264*a* or 264*b*, respectively), and from a thermal sensor located at an outer surface of the chassis (e.g., 281 or 282). If the temperature measured at one or more of these sensors (e.g., 211*a* or 211*b*) meets a control point (e.g., 50 degrees Celsius) for triggering the integrated antenna power and cooling management system, the power drawn by the antenna nearest the sensor measuring the control point temperature and the packet size or current data bandwidth being used for the data burst transmitting via that antenna may be determined by the integrated antenna power and cooling management system. The integrated antenna power and cooling management system may also measure the temperature at one or more points along the chassis (e.g., 281 or 282) via thermal sensor situated between the chassis portion and the antenna having a temperature at or above the control point. Based on this gathered data, the integrated antenna power and cooling management system in an embodiment may estimate the thermal energy currently being output by the antenna nearby the temperature sensor registering a temperature at or above the control point, as described in greater detail with respect to FIG. 3. The integrated antenna power and cooling management system in an embodiment may delay initiation of default thermal control mechanisms (e.g., as controlled by 212*a*) involving throttling of power delivered to the antenna (e.g., 264*a* or 264*b*) with initiation of active cooling measures such as with fan 212*b* until the thermal energy currently being output by the antenna approaches a maximum heat capacity of nearby information handling system components including passive cooling components 212*a* or the chassis 281 or 282, as described in FIG. 4, below.

Figure 3:
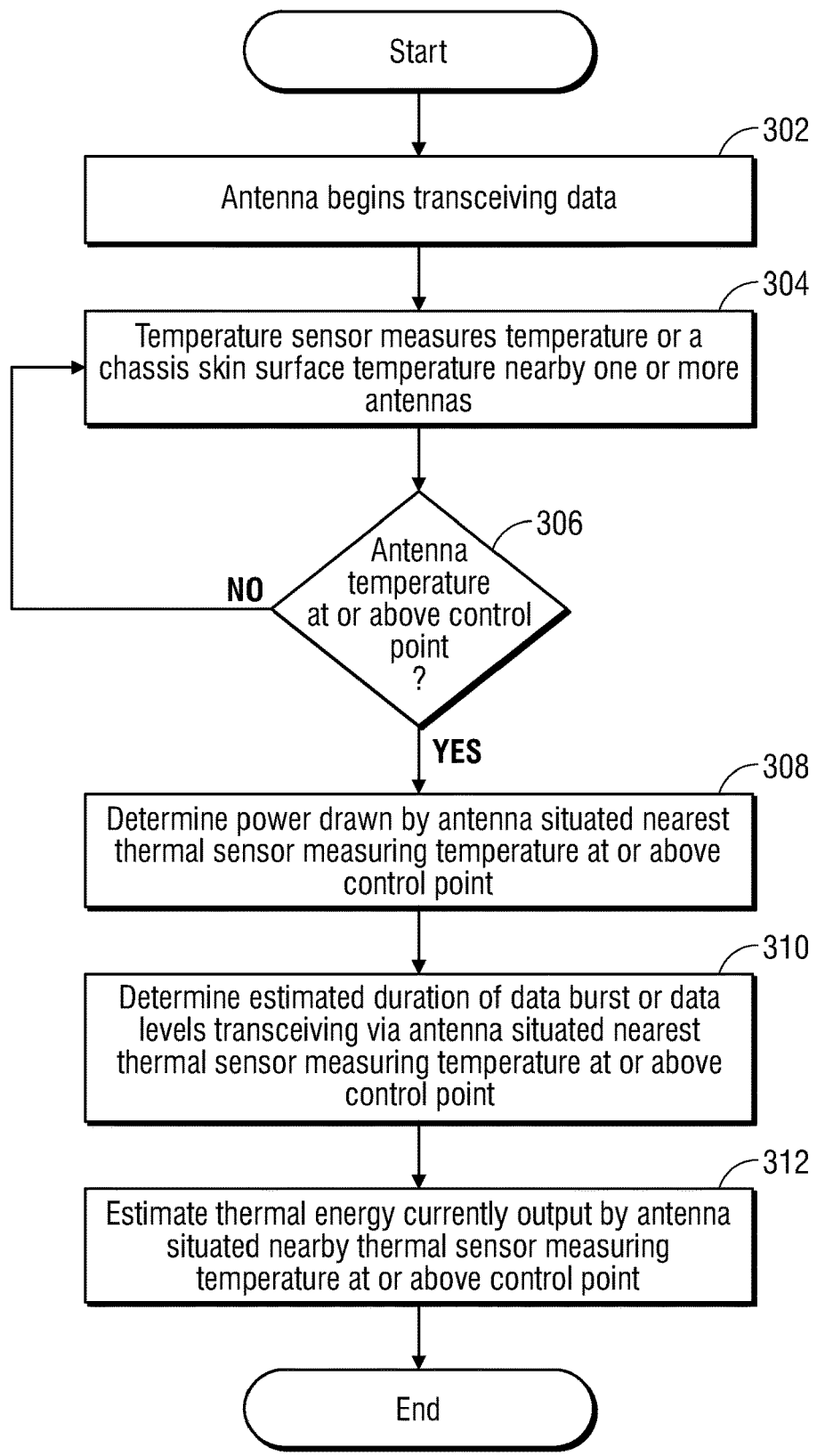
FIG. 3 is a flow diagram illustrating a method of determining an estimated amount of thermal energy output from a radio and antenna system of an information handling system according to an embodiment of the present disclosure.

FIG. 3 is a flow diagram illustrating a method of determining an estimated amount of thermal energy being output by an antenna according to an embodiment of the present disclosure. As described herein, the integrated antenna power and cooling management system in an embodiment may estimate the thermal energy being output by an antenna operating at or above a control point threshold. The integrated antenna power and cooling management system in such an embodiment may make such an estimation based on the amount of power drawn by the antenna, the temperature detected, and the estimated duration of a burst of data transmitting or the utilized data bandwidth via that antenna in an embodiment. In another embodiment, the integrated antenna power and cooling management system may make such an estimation based on the difference in temperatures measured at the antenna and at the chassis skin surface.

At block 302, an antenna of the information handling system may begin transceiving data. For example, in an embodiment described with reference to FIG. 1, the antenna 166 may begin transceiving data. In some embodiments, such data transmission may include a burst transmission or continuous high speed or high bandwidth transmission occurring in accordance with the 5G standard, which may require increased power supplied by the power management unit 104 to the antenna 166. Such an increase in power supply may also cause an increase in temperature at the antenna 166, and thus the information handling system chassis, as measured by the temperature sensor 111. In one embodiment, beginning transmission of a data burst in such a way may trigger determination of an estimated thermal energy being output by the antenna transceiving such a burst of data.

An antenna temperature sensor in an embodiment may measure a temperature at or nearby one or more antennas or at a chassis outer surface at block 304. For example, in an embodiment described with reference to FIG. 2, the integrated antenna power and cooling management system executed by an embedded controller in an embodiment may receive temperature measurements from a thermal sensor (e.g., 211*a* or 211*b*) at a chassis outer surface which may be located nearby an antenna (e.g., 264*a* or 264*b*, respectively). In another embodiment, the integrated antenna power and cooling management system may receive a first temperature measurement from a temperature sensor (e.g., 211*a* or 211*b*) for an antenna (e.g., 264*a* or 264*b*), and a second temperature measurement from a thermal sensor situated between the antenna (e.g., 264*a* or 264*b*) and the chassis (e.g., 281 or 282) outer skin. This second temperature sensor may also be situated such that one or more other information handling system components capable of absorbing thermal energy emitted by the antenna are situated between the second thermal sensor and the antenna (e.g., 264*a* or 264*b*). As described with reference to FIG. 1, this antenna temperature may be measured by the temperature sensor 111 and transmitted to the integrated antenna power and cooling management system 140.

At block 306, the integrated antenna power and cooling management system in an embodiment may determine whether the measured temperature of the antenna is at or above a preset control point. If the temperature measured at one or more of the temperature sensors (e.g., 211*a* or 211*b*) meets a control point (e.g., 50 degrees Celsius) for triggering the integrated antenna power and cooling management system, this may indicate a need for the integrated antenna power and cooling management system to begin monitoring and controlling thermal energy output by the antenna to ensure the skin surface temperature of the chassis remains within comfortable levels for a user. The control point temperature in an embodiment may be preset and stored in a memory accessible by the integrated antenna power and cooling management system. As heat generated by the antenna increases in an embodiment, various components of the information handling system may passively absorb or actively offset this thermal energy. For example, such components may include the thermal control system 212a, the fan 212b, the network interface device 260 directing operation of the antennas 264a and 264b, or portions (e.g., 281 or 282) of the chassis itself.

The integrated antenna power and cooling management system in an embodiment may estimate remaining capacity of these various components to absorb such thermal energy prior to an increase in the skin surface temperature of the chassis components (e.g., 281, 282, or 210a). Such an estimation in an embodiment may be made based on a known maximum heat capacity of these components, and an estimated thermal energy currently output by the antenna operating at or above the control point. Once the thermal energy output by the antenna exceeds the known maximum heat capacity of various information handling system components or the chassis situated nearby the antenna or known to absorb heat from the antenna, the thermal energy output by the antenna may begin to increase the skin surface temperature of the chassis. In order to avoid such an increase in skin surface temperature of the chassis, the integrated antenna power and cooling management system in an embodiment may trigger one or more active cooling mechanisms followed by thermal control measures that may impact data transmission such as throttling or reduction of burst transmission once the total heat capacity for all components surrounding the antenna has been reached, as described in greater detail with respect to FIG. 4, below.

If the temperature of the antenna is below the preset control point, the integrated antenna power and cooling management system may not need to monitor or control the temperature of the chassis or the antenna, and the method may proceed back to block 304 for routine or periodic measurement of the temperature. If the temperature of the chassis or antenna is at or above the preset control point, the method may proceed to block 308 to trigger the integrated antenna power and cooling management system to begin monitoring and managing temperature of the chassis or the antenna in order to ensure the skin surface temperature of the chassis remains at or below comfortable levels for a user.

The integrated antenna power and cooling management system in an embodiment in which the temperature has been measured at or above the control point may determine the amount power being drawn by the antenna situated nearest the thermal sensor measuring the temperature at or above the control point at block 308. For example, in an embodiment described with reference to FIG. 1, the power management unit may supply an average of 6 Watts, and up to 9 Watts of power to the antenna 166 for transceiving of data in a burst. In other embodiments, the power management unit may deliver other amounts of power. The integrated antenna power and cooling management system 140 in an embodiment may determine the known wattage supplied to the antenna 166 via communication with the power management unit 104, or the network interface device 160, for example. In some embodiments, the network interface device 160 may include a power amplifier 165 operating to amplify the amount of power supplied to the antenna 166. In such an embodiment, the network interface device 160 may indicate to the integrated antenna power and cooling management system 140 the amount of amplified power being drawn by the antenna 166 at a given time. In an embodiment in which the antenna is transmitting continuously, rather than in a burst, the method may proceed directly from block 308 to block 312 for determination of thermal energy output by the antenna based on temperature gradients, rather than on power and duration of burst transmission.

At block 310 the integrated antenna power and cooling management system in an embodiment may estimate the duration of the data burst being transmitted via the antenna situated nearest the thermal sensor measuring the temperature at or above the control point. For example, in an embodiment described with reference to FIG. 1, the integrated antenna power and cooling management system 140 may determine the transceiving bitrate (e.g., 20 Gbit/s) and packet size (e.g., 400 GB) of the data burst via communication with the network interface device 160. The integrated antenna power and cooling management system 140 may then divide the packet size by the transceiving bitrate to determine the estimated duration (e.g., 160 seconds) of the data burst.

The integrated antenna power and cooling management system in various embodiments may determine at block 312 an estimated thermal energy likely to be output by the antenna operating at or above the control point during the data burst. In an embodiment in which the antenna is transmitting a data burst, this determination may be made based on the power being drawn by the antenna, temperature of the antenna, and estimated duration of the burst. For example, the integrated antenna power and cooling management system in an embodiment may estimate the thermal energy likely to be output by the antenna during this data burst by multiplying the power supplied to the antenna determined at block 308 by the estimated time duration of the data burst determined at block 310, and dividing by a known mass of the antenna (e.g., as stored in a lookup table) and the temperature of the antenna measured at block 304.

In an embodiment in which the antenna is transmitting continuously, rather than in a burst format, the duration of transmission may not be known. In such an embodiment, the integrated antenna power and cooling management system may determine an estimated thermal energy being output by the antenna based upon measured temperature gradients between the antenna and one or more points along the chassis skin surface. As described above at block 304, the integrated antenna power and cooling management system may receive a first temperature measurement from a temperature sensor (e.g., 211a or 211b) for an antenna (e.g., 264a or 264b), or a second temperature measurement from a thermal sensor situated between the antenna (e.g., 264a or 264b) and the chassis (e.g., 281 or 282) outer skin. This second temperature sensor may also be situated such that one or more other information handling system components capable of absorbing thermal energy emitted by the antenna are situated between the second thermal sensor and the antenna (e.g., 264a or 264b). The heat capacity and masses of each of these components may be stored in a lookup table correlated to an identification of a thermal sensor situated nearby those components. For example, a second thermal sensor may be situated between the chassis skin surface and a passive cooling strip of a thermal control system. That second thermal sensor in an embodiment may also be associated with a measured heat capacity and mass for that passive cooling strip. In such an embodiment, the integrated antenna power and cooling management system may estimate the thermal energy output by the antenna by multiplying the mass and heat capacity of the passive cooling strip by the difference in the temperatures measured by the first temperature sensor (e.g., located at the antenna) and the second temperature sensor (e.g., located between the passive cooling strip and the chassis skin surface). The heat capacity and mass may be stored in a lookup table that also provides similar information for each of a plurality of other information handling system components (e.g., other than the passive cooling strips) known to absorb thermal energy from the antenna. Using temperature measurements from thermal sensors located between these additional components and the chassis skin surface, along with the lookup table, the integrated antenna power and cooling management system may similarly estimate thermal energy output by the antenna based on thermal absorption for these additional components.

In such a way, the integrated antenna power and cooling management system in an example embodiment may determine the thermal energy likely to be output by an antenna having a mass of 1.2 grams, operating at a temperature of 75 degrees Celsius, and supplied with 6 Watts of power for 60 seconds is equivalent to 360 Joules. This value may be used to determine control of active cooling systems as well as manage data transmissions via the monitored antenna before thermal control methods are employed that degrade data bandwidth or performance of the monitored antenna. This is described in further detail in embodiments of FIG. 4. The method for estimating thermal energy output by an antenna may then end.

Figure 4:
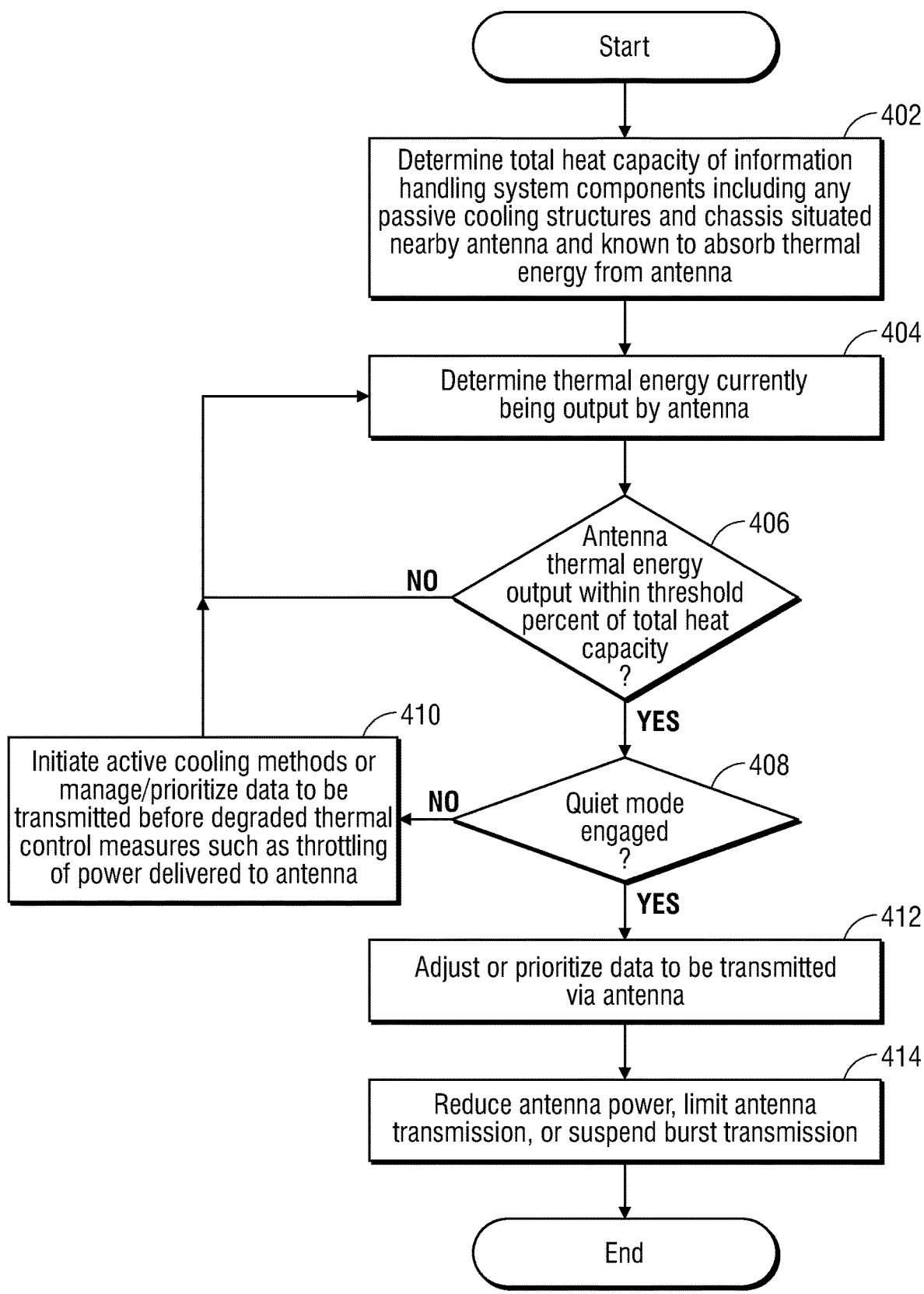
FIG. 4 is a flow diagram illustrating a method of managing initiation of an active thermal control system for delaying throttling of power supplied to an antenna to optimize data transmission according to an embodiment of the present disclosure.

FIG. 4 is a flow diagram illustrating a method of managing antenna transmission and delaying thermal control measures such as throttling of power supplied to an antenna based on the heat capacities of various components or the chassis surrounding the antenna have been depleted according to an embodiment of the present disclosure. As described herein, the integrated antenna power and cooling management system in an embodiment may delay default thermal control mechanisms involving throttling of power delivered to antennas or limits on transmission that degrade data transmission while initiating other active thermal control mechanisms, prior to such thermal control measures, in order to increase the available time in which data transmissions, such as burst transmissions may occur. The integrated antenna power and cooling management system in an embodiment may manage heat producing data transmission in an embodiment by exploiting the capacity for various information handling system components such as passive cooling structures or the chassis surrounding the antenna transceiving the data to absorb the heat generated by that antenna. Once the heat capacities for these components has been depleted or nearly depleted in an embodiment, the integrated antenna power and cooling management system may initiate active thermal control mechanisms to ensure the excess heat generated by the antenna but not absorbed by the various nearby components does not increase the skin surface temperature of the chassis enclosing the information handling system beyond comfort levels for a user depending on user settings. Then thermal control measures that limit antenna data transmission capacity may be implemented and the CPU/GPU may utilize other antennas to upload data or may require data prioritization to control or limit data uploads.

The integrated antenna power and cooling management system in an embodiment may determine at block 402 the total heat capacity of all information handling system components situated nearby an antenna transmitting data, such as in a burst, and known to absorb heat generated by that antenna. For example, in an embodiment described with reference to FIG. 2, heat energy output by the antenna 264*a* may be absorbed in an embodiment by one or more of the network interface device 260, the CPU 201, the motherboard 290, or portions of the chassis (e.g., 281 or 282). In a further example embodiment, the heat energy output by the antenna 264*b* may be absorbed in an embodiment by one or more of the passive thermal control system 212*a*, the fan 212*b*, or other components. The components known to absorb heat from each antenna (e.g., 264*a* or 264*b*), and the total heat capacity for each of those components together, for each antenna deployed on an information handling system and specific to known information handling system models and their architecture may be stored in a lookup table accessible to the integrated antenna power and cooling management system in an embodiment. For example, such a lookup table may associate the antenna 264*a* with a total heat capacity for nearby components (e.g., 260, 290, 281, and 282) of 1250 Joules. As another example, such a lookup table may associate the antenna 264*b* with a total heat capacity for nearby components (e.g., 260, 290, 212*a*, 212*b*, 281, and 282) of 1500 Joules. In such embodiments, the total heat capacity for components operating nearby the antenna 264*b* may be greater than the total heat capacity for components operating nearby the antenna 264*a*, for example, due to the proximity of the antenna 264*a* to other heat generating components (e.g., CPU 201), or due to the proximity of the antenna 264*b* to heat removing or thermal control components (e.g., 212*a* or 212*b*).

At block 404, the integrated antenna power and cooling management system in an embodiment may estimate the thermal energy likely to be output by the antenna during a burst transmission of data, or during continuous transmission at a high data rate or high bandwidth. As described above with respect to FIG. 3, this determination may be made upon initiation of such a transmission including a burst transmission in an embodiment (e.g., as described with respect to block 302), or upon determination that the antenna transmitting such a burst of data or continuous high bandwidth or high data rate is operating at or above a control point temperature (e.g., 50 degrees Celsius), as described. In such an embodiment, the integrated antenna power and cooling management system may determine, for example, that the antenna triggering such a determination is likely to output an estimated number of Joules (e.g., 1250 Joules) of thermal energy during the burst transmission (e.g., 400 GB) of data over a period of time (e.g., 160 seconds). In another embodiment, the integrated antenna power and cooling management system may determine, for example, that the antenna is outputting and estimated number of Joules (e.g., 1250 Joules) based on a difference in temperature measured at the antenna and temperature measured between another component of the information handling system (e.g., passive cooling strip) and the chassis skin surface.

The integrated antenna power and cooling management system in an embodiment may determine at block 406 whether the energy estimated to be output by the antenna is within a threshold percent of the total heat capacity for nearby components. The integrated antenna power and cooling management system may estimate the thermal output for the high data bandwidth antenna, such as during a 5G signal transmission, based on a measured power supplied to the antenna as reported via a power management unit or from a power amplifier in the antenna system in an embodiment. In another embodiment, the integrated antenna power and cooling management system may estimate the thermal output for the high data bandwidth antenna, such as during a 5G signal transmission, based on a measured difference in a first temperature of the antenna via a first thermal sensor and a second temperature at a portion of the chassis via a second thermal sensor. In another embodiment, the integrated antenna power and cooling management system may estimate the thermal output for the high data bandwidth antenna, such as during the 5G signal transmission, based on the measured operating temperature of the information handling system via assessment of a temperature via a thermal sensor in the information handling system and determination of combined heat capacity of components and the chassis within a proximity of the high data bandwidth antenna. For example, a thermal sensor may monitor temperature of the outer skin surface of a portion of the chassis, the temperature at the antenna, or elsewhere in the information handling system within a proximate distance (e.g., within 1 centimeter, 10 centimeters, 50 centimeters or any proximate distance range as described herein) and relate those temperature measurements with components known to be within that proximate range of the heat producing antenna and their heat capacities. Then power supplied to the heat-producing antenna or data bandwidth utilized and to be continuously utilized by the information handling system may be used to project additional heating by the heat producing antenna relative to the total or combined heat capacity of those proximate components or chassis as in a look up table by the integrated antenna power and cooling management system in some embodiments. With this projection management of cooling systems, data prioritization, or thermal controls that may degrade antenna performance may be conducted to maximize performance and utilization of the high data bandwidth antenna system despite heating.

For example, in an embodiment described with reference to FIG. 2, the antenna 264a may be transmitting a data burst or continuous high data rate or high bandwidth transmission or may be operating at the control point temperature (e.g., as described above with reference to block 306 of FIG. 3). In such an embodiment, the integrated antenna power and cooling management system may determine the antenna 264a is likely to output 1250 Joules of thermal energy during the burst or continuous transmission, and that the nearby components (e.g., 260, 290, 281, and 282) have a total heat capacity of 1250 Joules. In such an embodiment, the thermal heat output by the antenna is likely to come within a threshold percent, for example ten percent, of (or meet or exceed) the ability of all nearby components to absorb this heat, and the integrated antenna power and cooling management system may initiate an active thermal control mechanisms to ensure the surface skin temperature does not rise above comfort levels for users. It is contemplated that any threshold percent value may be used in various embodiments.

In another example, the antenna 264b may be transmitting a data burst or may be operating at the control point temperature (e.g., as described above with reference to block 306 of FIG. 3). In such an embodiment, the integrated antenna power and cooling management system may determine the antenna 264b is likely to output 1250 Joules of thermal energy during the burst or continuous transmission, and that the nearby components (e.g., 260, 290, 212a, 212b, 281, and 282) have a total heat capacity of 1500 Joules. In such an embodiment, the thermal heat output by the antenna is not likely to come within the threshold percent, for example ten percent, of the ability of all nearby components to absorb this heat. At this point, the integrated antenna power and cooling management system may return to block 404 for routine or periodic determination of thermal energy likely to be output by an antenna during a burst transmission.

If the energy currently absorbed is not within the threshold percent of a maximum allowable value, the various components of the information handling system may be capable of absorbing additional energy, and no further active thermal control mechanisms may be required. In such an embodiment, the method may proceed back to block 404 for a determination of the thermal energy likely to be output by the antenna during a burst or continuous transmission. By repeating the loop between blocks 404 and 406, the integrated antenna power and cooling management system may perform routine or periodic monitoring of antenna thermal output in order to determine if further thermal control methods are required to ensure the skin surface temperature of the chassis stays within comfort levels for users. The integrated antenna power and cooling management system in an embodiment may manage transmission time prior to thermal control measures that may degrade performance such as throttling of antenna power in such a way by leveraging the heat capacity of the various information handling system components surrounding the antenna. If the energy output by the antenna is estimated to be within the threshold percent of a total heat capacity for these various components, the ability of the various components of the information handling system to absorb thermal energy emitted by the antenna may be reaching a point of depletion, and further thermal control mechanisms may need to be initiated. The method may then proceed to block 408 to determine which active thermal control methods to employ, if any. Additionally, in some embodiments, the integrated antenna power and cooling management system may indicate to a CPU or GPU to prioritize data for transmission such that high priority data may utilize the high-bandwidth 5G antenna as described below. Other data at lower priorities may have transmission delayed or may utilize other available antenna systems.

At block 408, in an embodiment in which the thermal energy likely to be output by the antenna during a burst transmission is within a threshold percent of the total heat capacity for surrounding components and chassis, the integrated antenna power and cooling management system may determine whether the user has placed the information handling system in quiet mode, via the CPU or OS and a graphical user interface such as a settings interface. Users may place information handling systems in quiet mode for performance or when, for example, during video or phone calls in which the user and call participants need a quieter environment in order to understand each other. In other examples, a user may place an information handling system in a quiet mode when working in a quiet environment (e.g., library), or when attempting to focus. Quiet mode may be initiated, such as via a graphical user interface of a quite mode system executed by the OS when the user wishes the information handling system itself and its various components (e.g., fans, speakers, processors) to operate quietly or reduce operational noise.

If the user has not placed the information handling system in quiet mode, the integrated antenna power and cooling management system, the method may proceed to block 410 for initiation of active cooling systems other than the performance degrading thermal control measures such as throttling of power delivered to the antenna. These alternative cooling systems may generate some level of noise like noises of one or more fans, and thus, would be undesirable for use when in quiet mode.

The integrated antenna power and cooling management system in an embodiment in which the user has not placed the information handling system in quiet mode may utilize active cooling methods and thermal control methods before throttling of power delivered to the antenna or other thermal control measures the degrade antenna data bandwidth performance at block 410. As described above with reference to blocks 404-406, the integrated antenna power and cooling management system effectively extends the time period for burst and continuous high data rate or high bandwidth transmissions by leveraging the various components' abilities to absorb heat generated by the antenna to predict or determine limitations on available high data bandwidth transmissions. The integrated antenna power and cooling management system in an embodiment may extend this time period by employing cooling mechanisms other than throttling of antenna power, when available. For example, the integrated antenna power and cooling management system in an embodiment may instruct a fan to increase its speed, consequently decreasing the effect of the thermal heat generated by the antenna during the burst transmission on the skin surface of the chassis.

In other embodiments, at block 410, data prioritization may group data such that data types with high priority may be directed to high data bandwidth antenna systems (e.g., 5G antenna systems) that may also produce heat for better performance of applications with such high priority groupings. Other data may be delayed or redirected to other, lower data bandwidth antenna systems and protocols which may not be heat producing but do not provide the upload speeds or data bandwidth. For example, the integrated antenna power and cooling management system in an embodiment described with reference to FIG. 1 may instruct the SDN controller 180 to route transmissions pursuant to execution of software applications identified by the network load balancing driver 123 as high priority through a high data bandwidth antenna such as a 5G antenna 166, until antenna 166 is emitting thermal heat approaching a threshold percentage (e.g. 10%) of the total heat capacity of other components and the chassis surrounding antenna 166. The integrated antenna power and cooling management system in an embodiment described with reference to FIG. 1 may instruct the SDN controller 180 to route transmissions pursuant to execution of software applications identified by the network load balancing driver 123 as lower priority through other antennas other than antenna 166, if available, or may suspend transmission of lower priority data. Because the integrated antenna power and cooling management system in an embodiment does not employ this method until the heat generated by the antenna during the burst transmission is likely to come within the first threshold percent of the total heat capacity of surrounding components, the integrated antenna power and cooling management system effectively may predict remaining duration or amount of high-bandwidth data transmissions via the heat-producing, high data bandwidth antenna system. With this information, the integrated antenna power and cooling management system potentially extends the time period for such burst transmissions for high priority data by leveraging these various components' abilities to absorb heat generated by the antenna and determining when degraded thermal control measures may need to be employed.

Then, when the high data bandwidth antenna 166 is emitting thermal heat approaching a second threshold percentage (e.g. 1%) of the total heat capacity of other components and the chassis surrounding antenna 166, the integrated antenna power and cooling management system in an embodiment may instruct the SDN controller 180 to route transmissions pursuant to execution of software applications identified by the network load balancing driver 123 as high priority through alternative antennas other than antenna 166 as well, if available but which may degrade performance or may suspend high priority transmissions. Lower priority data may be suspended in some embodiments as well or may also use alternative antenna systems and protocols. The method may then proceed back to block 404 (and repeat the blocks of FIG. 3) to determine the thermal energy likely to be output by the antenna during the remainder of the burst or continuous high data rate or high bandwidth transmission.

If the user has placed the information handling system in quiet mode, use of noise-producing cooling mechanisms may be undesirable, and the method may proceed to block 412 for adjustment or prioritization of data to be transmitted via the high-bandwidth 5G antenna or for thermal control measures to limit performance of the antenna. Because the integrated antenna power and cooling management system in an embodiment does not employ this method until the heat generated by the antenna during the burst transmission is likely to come within a first threshold percent of the total heat capacity of surrounding components, the integrated antenna power and cooling management system effectively may predict remaining duration or amount of high-bandwidth data transmissions via the heat-producing, high data bandwidth antenna system. With this information, the integrated antenna power and cooling management system potentially extends the time period for such burst transmissions for high priority data by leveraging these various components' abilities to absorb heat generated by the antenna and determining when degraded thermal control measures may need to be employed.

In an embodiment in which the user has placed the information handling system in quiet mode, the integrated antenna power and cooling management system may adjust or prioritize data to be transmitted via the antenna at block 412. For example, the integrated antenna power and cooling management system in an embodiment described with reference to FIG. 1 may instruct the SDN controller 180 to route transmissions pursuant to execution of software applications identified by the network load balancing driver 123 as high priority through a high data bandwidth antenna 166, such as a 5G antenna, and redirect lower priority designated software applications to an antenna other than antenna 166, if available, or suspend lower priority data transmissions.

At block 414, the integrated antenna power and cooling management system in an embodiment may implement one or more thermal control measures such as reducing power supplied to the antenna, limiting high data bandwidth bursts or transmission, or suspending or diverting high data bandwidth transmissions. For example, in an embodiment described with reference to FIG. 2, the integrated antenna power and cooling management system executed by the processor 201 may transmit an instruction to the power management system or power amplifier of the network interface device to begin throttling power delivered to the antenna (e.g., 264a or 264b) when a second threshold percentage of heat capacity has been met. As another example, in an embodiment described with reference to FIG. 1, the integrated antenna power and cooling management system 140 may transmit an instruction to the power management unit 104 or the power amplifier 165 to throttle power supplied to the antenna 166. As yet another example, the integrated antenna power and cooling management system 140 may transmit an instruction to the network interface device 160 to limit further burst transmissions or to suspend burst transmissions or continuous high bandwidth or high data rate transmissions for a preset period of time. In another embodiment, as above, if high data bandwidth antenna 166 which also produces significant heat is emitting thermal heat approaching a second threshold percentage (e.g. 1%) of the total heat capacity of other components and the chassis surrounding antenna 166, the integrated antenna power and cooling management system in an embodiment described with reference to FIG. 1 may instruct the SDN controller 180 to route transmissions pursuant to execution of software applications identified by the network load balancing driver 123 as high priority through an antenna other than antenna 166 in an embodiment although this may degrade performance or may suspend transmissions. Lower priority data may also utilize the alternative antenna from antenna 166 or may be suspended in such an embodiment. The method may then end.

The blocks of the flow diagram of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing an integrated antenna power and cooling management system comprising:
    a first antenna situated proximate to one or more components and a passive cooling structure of the information handling system;
    a chassis enclosing the information handling system, the first antenna, and a wireless interface device with a wireless radio to generate a signal to transmit data via the first antenna, where the one or more components and the passive cooling structure proximate to the first antenna and the chassis are capable of absorbing a known total thermal heat capacity;
    the chassis having an outer surface coming into contact with human skin during execution of the information handling system;
    a temperature sensor to determine an operating temperature of at first antenna at the outer surface of the information handling system reaching a control point value; and
    a processor executing code instructions of the integrated antenna power and cooling management system to:
        estimate thermal output for the first antenna during the signal transmission of data relative to the known total thermal heat capacity of the one or more components and passive cooling structure proximate to the first antenna and the chassis; and
        initiate an active cooling system for cooling the chassis when the estimated thermal output for the first antenna reaches a preset threshold percentage of the known total thermal heat capacity of the one or more components and passive cooling structure proximate to the first antenna and the chassis.

2. The information handling system of claim 1, wherein the first antenna transmits data under a wireless protocol using a burst transmission.

3. The information handling system of claim 1, wherein the first antenna receives up to 9 Watts of power during the signal transmission of data.

4. The information handling system of claim 1 further comprising:
    the processor determining the estimated thermal output for the first antenna during the signal transmission of data based on a measured power supplied to the first antenna.

5. The information handling system of claim 1 further comprising:
    the processor determining the estimated thermal output for the first antenna during the signal transmission of data based on a determined data bandwidth for the signal.

6. The information handling system of claim 1 further comprising:
    the processor executing code instructions configured to route transmission of data pursuant to execution of a low priority software application defined by a network load balancing controller to a second antenna.

7. The information handling system of claim 1 further comprising:
    the processor executing code instructions configured to route a future transmission of data pursuant to execution of a high priority software application defined by a network load balancing controller to a second antenna when the operating temperature of the information handling system reaches a second control point value.

8. A method of integrating cooling systems and antenna power management systems comprising:
    determining a wireless interface device with a wireless radio is generating a wireless signal transmitting via an antenna situated proximate to a portion of a chassis and one or more components of an information handling system including a passive cooling structure capable of absorbing a known total thermal heat capacity;
    measuring, via a temperature sensor, an operating temperature of the information handling system;
    estimating, via the processor, a thermal energy to be output by the antenna during the 5G signal transmission;

identifying remaining period of wireless signal transmission available until the estimated thermal energy output reaches a first threshold percentage of the known total thermal heat capacity of the chassis and the one or more components and the passive cooling structure proximate to the antenna, via the processor, and throttling power delivered to the antenna when the estimated thermal energy output for the antenna during the wireless signal transmission is within a second threshold percentage of the known total thermal heat capacity of the chassis and the one or more components and the passive cooling structure proximate to the antenna; and prioritizing data transmitted via the wireless signal transmission during the remaining period of the wireless signal transmission available before the second threshold percentage of the known total thermal heat capacity of the chassis and the one or more components and the passive cooling structure proximate to the antenna is reached such that an increase occurs to an operating temperature at an outer surface of the chassis coming into contact with human skin during execution of the information handling system.

9. The method of claim 8 further comprising:
determining, via the processor, the thermal output of the antenna reaches the first threshold percentage of the known total thermal heat capacity of the chassis and the one or more components and the passive cooling structure proximate to the antenna to trigger an active cooling system to cool the information handling system.

10. The method of claim 8 further comprising:
estimating, via the processor, the thermal output for the antenna during the wireless signal transmission based on a measured power supplied to the antenna.

11. The method of claim 8 further comprising:
estimating, via the processor, the thermal output for the antenna during the wireless signal transmission based on a measured difference in a first temperature of the antenna and a second temperature of a portion of the chassis.

12. The method of claim 8 further comprising:
estimating, via the processor, the thermal output for the antenna during the wireless signal transmission based on the measured operating temperature of the information handling system.

13. The method of claim 8 further comprising:
delaying the throttling of power delivered to the antenna by increasing a speed of a fan cooling the information handling system after the estimated thermal output for the antenna during the wireless signal transmission is within the preset second threshold percentage of the known total thermal heat capacity of the portion of the chassis and the one or more components and the passive cooling structure proximate to the antenna.

14. The method of claim 8, wherein the antenna receives at least 6 Watts of power during the wireless signal transmission.

15. An information handling system executing an integrated antenna power and cooling management system comprising:
a first antenna situated proximate to one or more components including passive cooling system structures of the information handling system capable of absorbing a thermal heat capacity;
a chassis enclosing the information handling system, the first antenna, and a wireless interface device with a wireless radio to generate a signal to be transmitted via the first antenna, wherein the one or more components including passive cooling system structures and the chassis proximate to the first antenna have a known total thermal heat capacity stored in a memory;
the chassis having an outer surface coming into contact with human skin during execution of the information handling system;
a temperature sensor to determine an operating temperature of the information handling system reaching a control point value; and
a controller executing code instructions of the integrated antenna power and cooling management system to:
estimate, upon the operating temperature reaching the control point value, a thermal output for the first antenna during the signal transmission relative to a preset threshold percentage of the known total thermal heat capacity of the one or more components including the passive cooling system structures and the chassis proximate to the first antenna;
initiate an active cooling system for cooling the chassis when the estimated thermal output for the first antenna reaches the preset threshold percentage of the known total thermal heat capacity of the one or more components and passive cooling structure and the chassis proximate to the first antenna;
transmit data pursuant to execution of a high priority software application defined by a network load balancing controller via the first antenna; and
route a future transmission of data pursuant to execution of a low priority software application defined by the network load balancing controller to a second antenna.

16. The information handling system of claim 15 further comprising:
the processor executing code instructions to delay throttling of power delivered to the first antenna via the control of the active cooling system configured to increase a speed of a fan cooling the information handling system after the estimated thermal output for the first antenna during the signal transmission is within the preset threshold percentage of the known total thermal heat capacity of the one or more components including the passive cooling system structures and the chassis proximate to the first antenna.

17. The information handling system of claim 15 further comprising:
the processor to determine the information handling system has been placed into a quiet mode to eliminate activating the active cooling system to cool the information handling system based on the placement in the quiet mode and to prioritize routing the future transmission of data pursuant to the execution of the low priority software application defined by the network load balancing controller to the second antenna before initiating the active cooling system.

18. The information handling system of claim 15 further comprising:
the processor to determine the estimated thermal output for the first antenna during the signal transmission based on a measured power supplied to the first antenna.

19. The information handling system of claim 15 further comprising:
the processor to determine the estimated thermal output for the first antenna during the signal transmission based on a determined utilized data bandwidth size for the signal.

20. The information handling system of claim 15 further comprising:
    the processor to determine the estimated thermal output for the first antenna during the signal transmission based on the measured operating temperature of the first antenna.

\* \* \* \* \*